United States Patent
Bertacchini et al.

(10) Patent No.: US 11,988,739 B2
(45) Date of Patent: May 21, 2024

(54) AREA-SELECTIVE RADAR DETECTION

(71) Applicant: Inxpect S.p.A., Brescia (IT)

(72) Inventors: Ugo Bertacchini, Brescia (IT); Alessio Degani, Brescia (IT); Andrea Tartaro, Brescia (IT)

(73) Assignee: Inxpect S.p.A., Brescia (IT)

( * ) Notice: Subject to any disclaimer, the term of this patent is extended or adjusted under 35 U.S.C. 154(b) by 367 days.

(21) Appl. No.: 17/373,880

(22) Filed: Jul. 13, 2021

(65) Prior Publication Data

US 2022/0018952 A1  Jan. 20, 2022

(30) Foreign Application Priority Data

Jul. 16, 2020 (IT) .................. 102020000017365

(51) Int. Cl.
*G01S 13/88* (2006.01)
*G01S 13/56* (2006.01)

(52) U.S. Cl.
CPC ............ *G01S 13/888* (2013.01); *G01S 13/56* (2013.01)

(58) Field of Classification Search
CPC ....................................................... G01S 13/56
See application file for complete search history.

(56) References Cited

U.S. PATENT DOCUMENTS

| 9,229,102 | B1 | 1/2016 | Wright et al. | |
|---|---|---|---|---|
| 2008/0165046 | A1* | 7/2008 | Fullerton | G01S 7/003 342/21 |
| 2016/0154089 | A1* | 6/2016 | Altman | G08B 29/26 367/124 |

FOREIGN PATENT DOCUMENTS

| EP | 2533219 | 12/2012 |
|---|---|---|
| EP | 3385748 | 10/2018 |

OTHER PUBLICATIONS

Search Report, Written Opinion dated Apr. 6, 2021; Application IT102020000017365; 13 pages.

* cited by examiner

*Primary Examiner* — Timothy A Brainard
*Assistant Examiner* — Helena H Seraydaryan
(74) *Attorney, Agent, or Firm* — Mark Bandy; Rankin Hill & Clark, LLP

(57) ABSTRACT

A method of radar detection of targets in an environment, comprising cyclically obtaining a detection profile that associates with each position in the protected area an amount of radar signal that has been reflected, and detecting targets from the detection profile in different modes. A base mode is used for a first series of cycles and is insensitive to motionless targets and sensitive to dynamic targets that move between different locations in the protected area. When the base mode detects a target, two additional modes are started, which are active in different areas. In first areas, a fine movement detection mode is used, which also neglects motionless targets and may be more sensitive than the base mode. In second areas, a presence mode detects both dynamic and motionless targets. When neither the presence mode nor the fine movement mode detects any target for a sufficient time, no people in danger are deemed to be present in the area and the base mode may be restored.

11 Claims, 3 Drawing Sheets

AREA-SELECTIVE RADAR DETECTION

FIELD OF THE INVENTION

The present invention finds application in the field of radar detection, especially for workplace safety applications.

BACKGROUND ART

Radar detection can detect targets in an environment based on their reflection of radar signals. Many applications use processing operations to separate the signal contributions reflected from fixed targets (i.e. the background signal) and from moving targets, so that objects that are stably present in the environment will not be signaled.

The most common techniques dynamically update background information, so that a target that remains stationary for a sufficient time is no longer signaled, and is deemed to be a new part of the static scenario.

One possible application is industrial safety. Here, radars are used to monitor personnel access to hazardous areas, such as the surroundings of an operating machine, to trigger an alarm or to automatically secure the hazardous area, for example by slowing down or shutting down the machine.

Although fixed objects are not generally required to be signaled by the radar, for maximum safely the radar should keep on signaling signal certain types of targets that stop in the environment. This is namely the case of a person entering the protecting area and remaining still for any possible reason, especially if he/she has had an accident that prevents him/her from moving, due to the hazard in that area.

SUMMARY OF THE INVENTION

The object of the present invention is to obviate the above discussed drawbacks of the prior art, and in particular to allow a radar to understand when the protected area has become free again after an alarm, by discriminating the case of a person who stopped in the protected area from inanimate stationary objects that are always present therein or may have been deposited there during operation.

The applicant found that a stationary person can be easily identified by the radar if the processing operations that discriminate moving targets from fixed targets are not used, i.e. if the fixed target contribution is maintained to simply signal the presence of any target, either fixed or moving. On the other hand, if the fixed target contribution were maintained over the entire protected area, the radar would permanently signal the presence of any fixed object, even when there is no danger condition for people.

The applicant also found that the analysis of the slightest signal changes from any position affords detection of the movements of animated targets that have stopped but that have sufficient vital signs, such as breathing, heart beat, weight balance, etc. While this mode can detect the slightest movements, it still suffers from two drawbacks. First, a person who has had a serious accident in the hazardous area and who is completely still may not be detected. In addition, the high sensitivity of this mode may lead to false alarms caused by targets outside the hazardous area, that still cause small signal changes in the hazardous area, for example due to multiple reflections of certain portions of the signal before collection by the radar.

Therefore, the applicant has provided a method of radar detection of targets according to any one of the appended claims, which achieves the intended objects while reducing the above discussed problems.

In particular, in the invention at least two, and preferably three different target detection modes, are used at different times and/or positions, i.e. a first movement detection mode, a second motion movement mode, and a presence detection mode.

The first movement detection mode is active when there is no reason to suspect the presence of targets in the protected area. Therefore, the signal contribution of motionless targets is neglected. The detection of a dynamic target triggers the other two modes, whose primary task is to maintain the alarm state as long as there is no certainty that everyone has exited the protected area. As soon as this certainty is reached, the first movement detection mode is restored.

When the two remaining presence or movement detection modes are on, they operate simultaneously in different areas within the protected area. Advantageously, the presence detection mode does not omit the contribution of the motionless targets, thereby ensuring complete safety where it is activated. However, permanent alarms from inanimate objects are avoided by appropriately choosing to activate the second movement detection mode where inanimate targets are known to be present. The second movement detection mode is preferred to be more sensitive than the first, but in less advantageous embodiments they can be the same mode.

In certain embodiments, the protected area is split to determine where to use the presence mode and the second movement detection mode in an automated manner by the radar. In addition, splitting updates may be provided to account for changes in the arrangement of inanimate objects.

Further characteristics and advantages of the invention will be recognizable by a skilled person from the following detailed description of exemplary embodiments of the invention.

DETAILED DESCRIPTION

Figure 1:
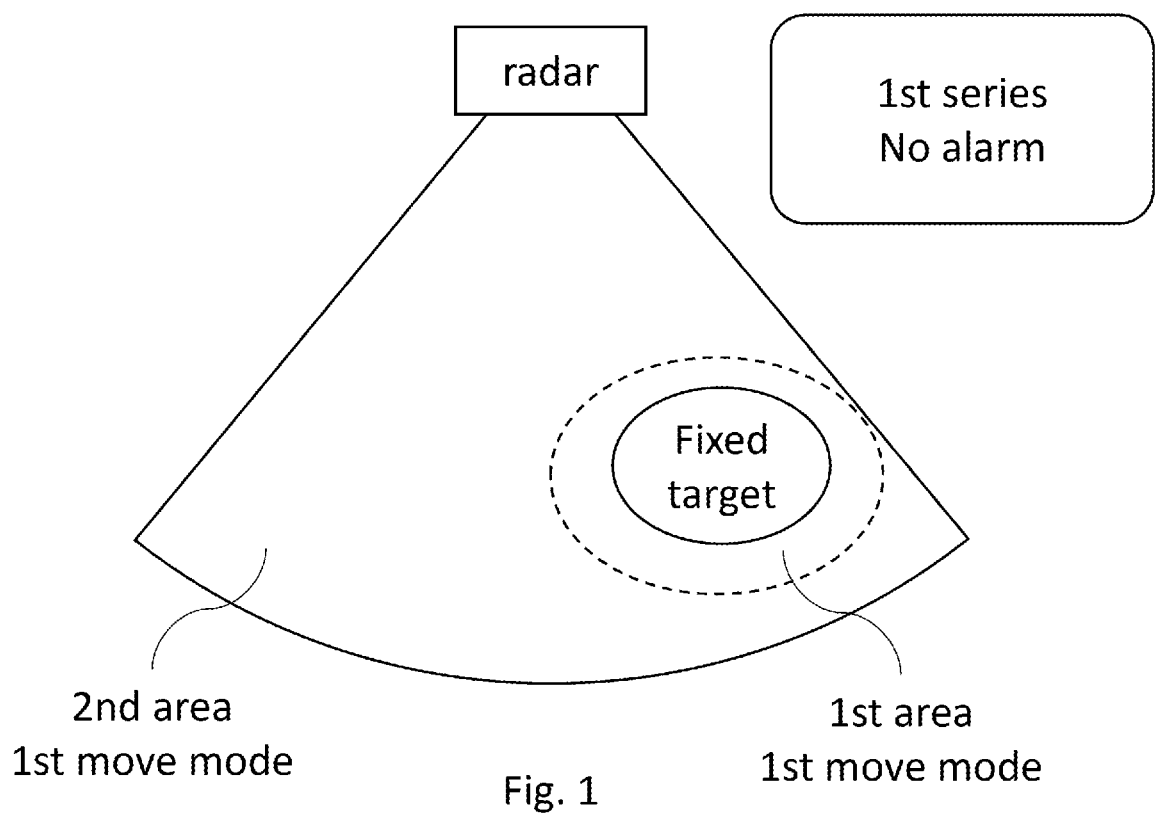
FIGS. 1-6 are schematic views of a radar and its field of view, including some fixed and moving targets, during different detection cycles.
Figure 2:
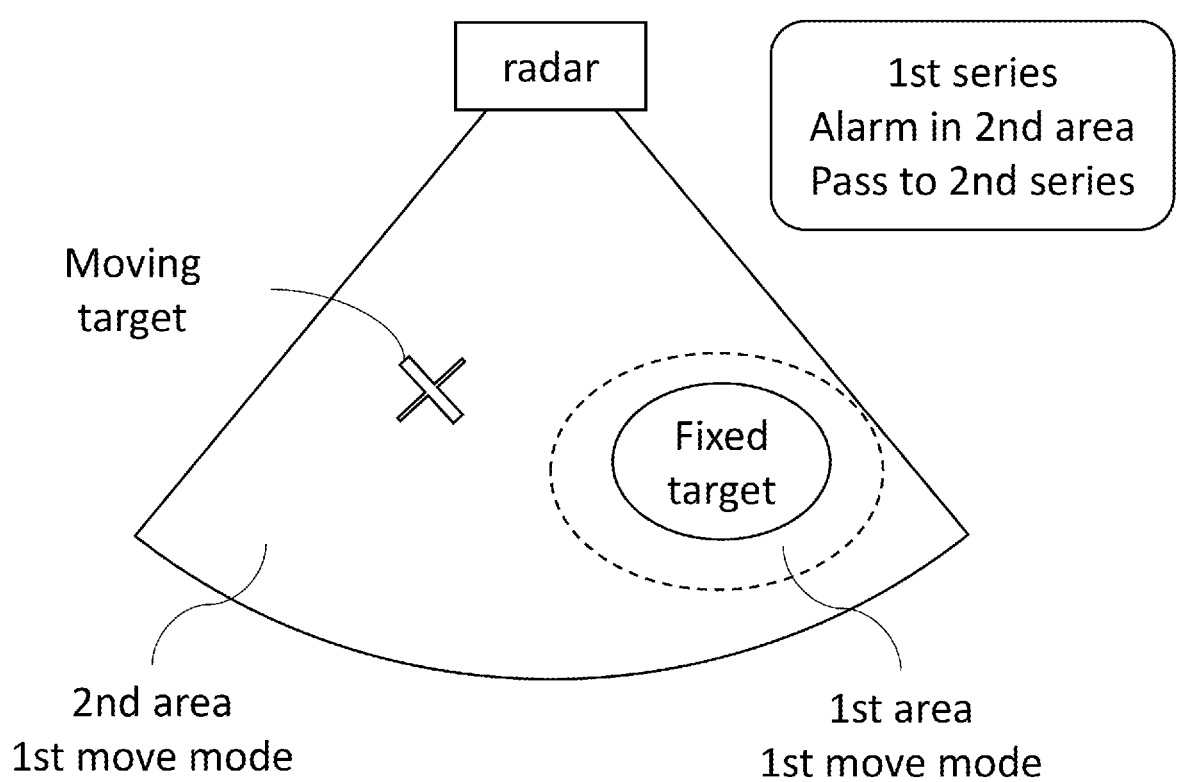
Figure 3:
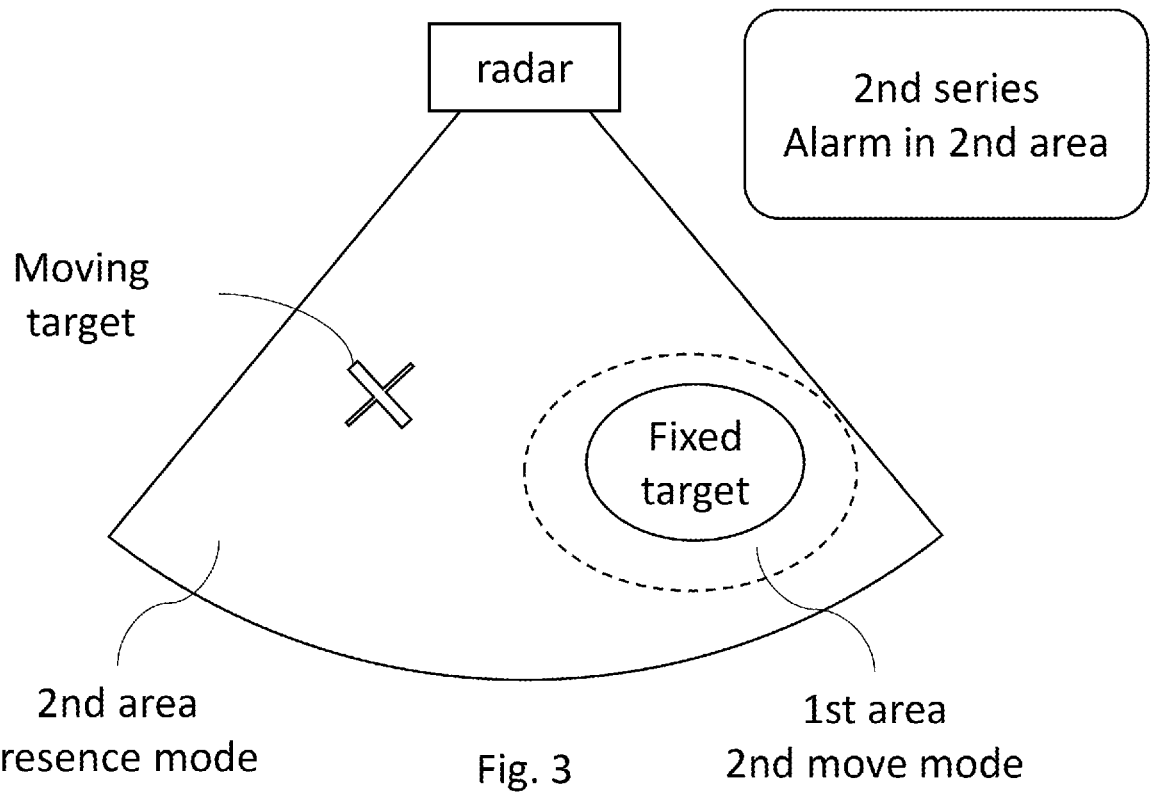
Figure 4:
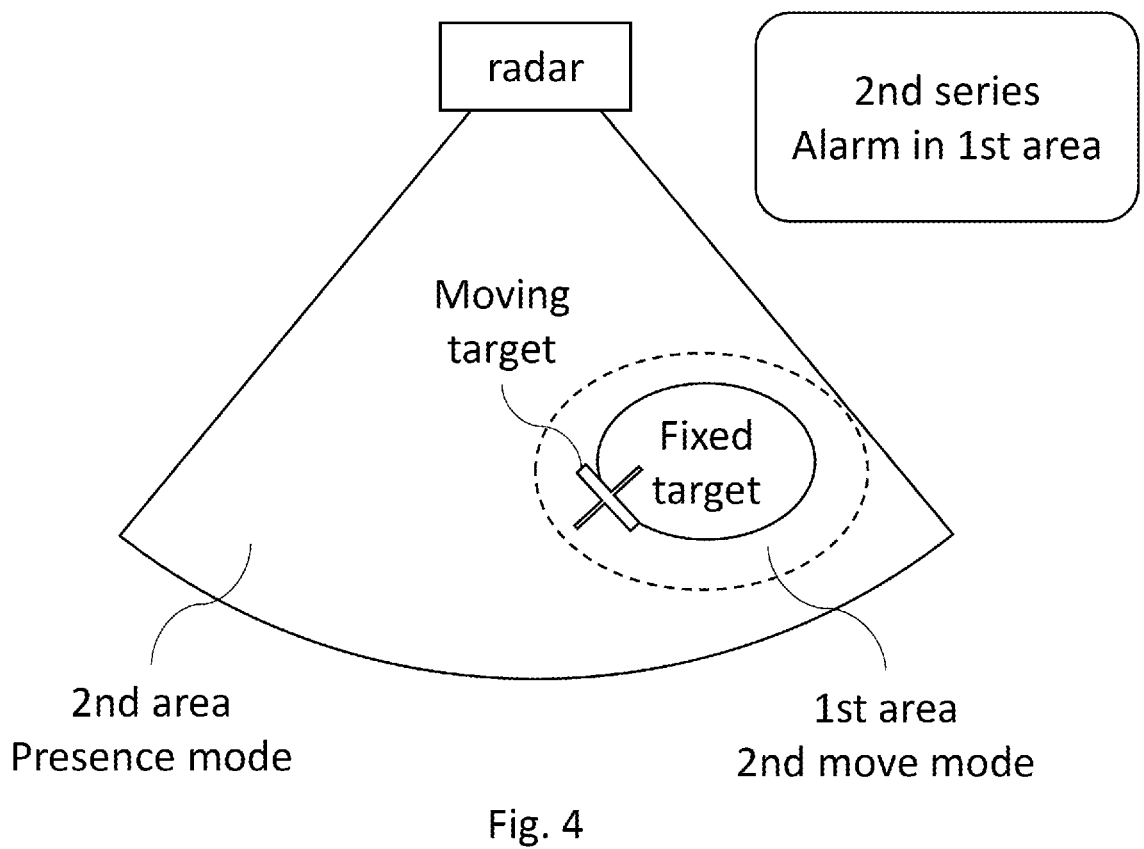
Figure 5:
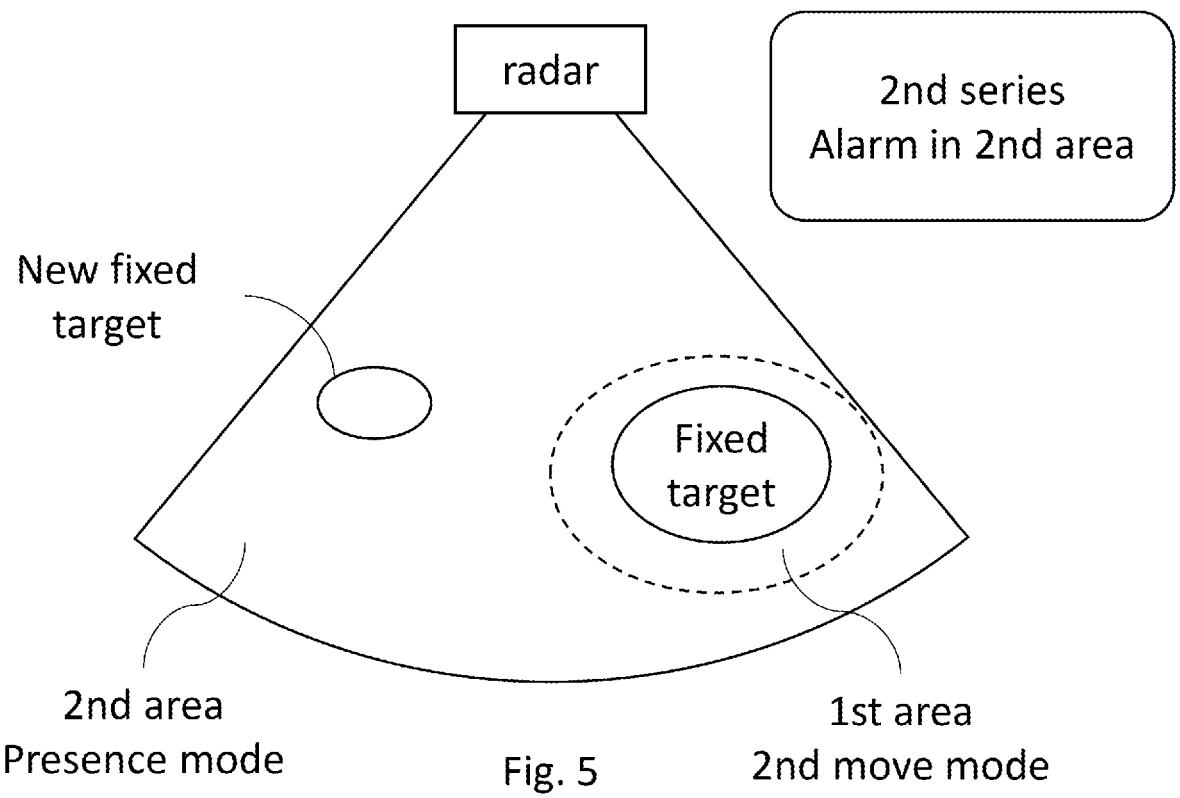
Figure 6:
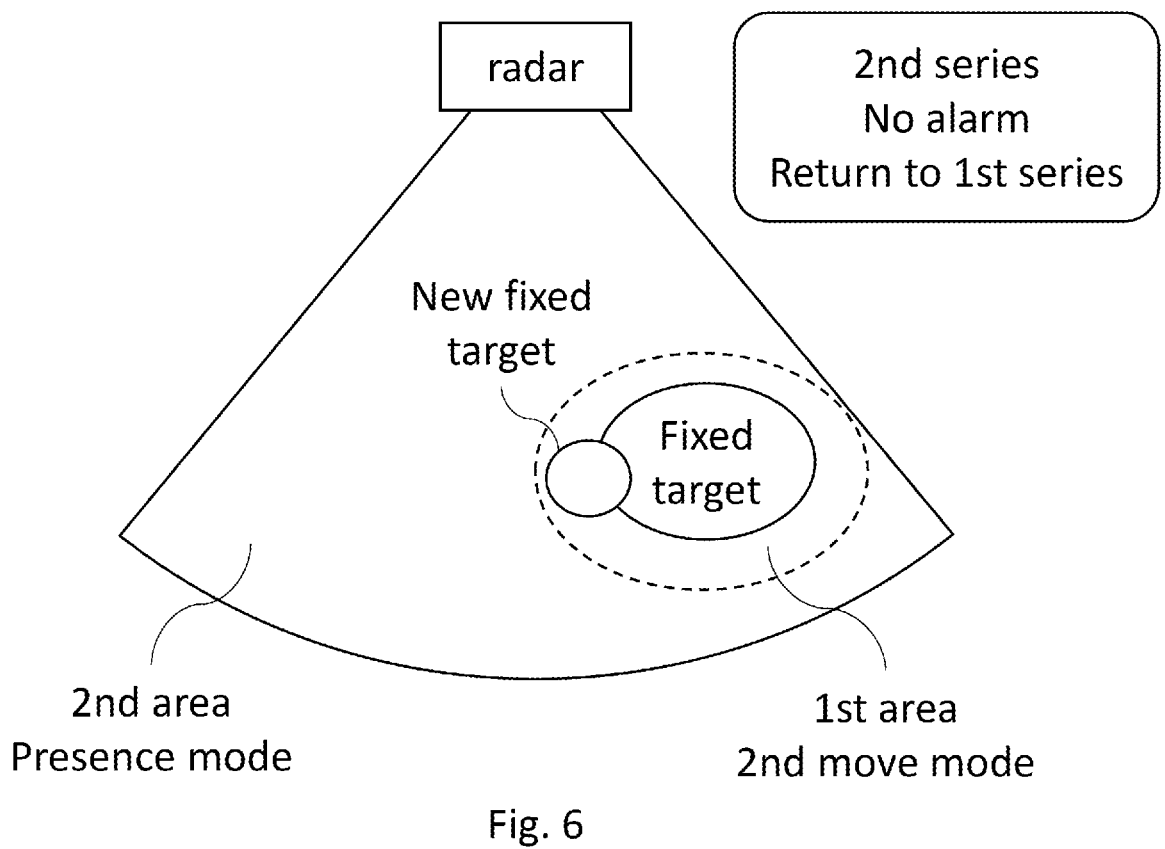

The method of the invention provides radar detection of targets in an environment. Therefore the radar has its own field of view in the environment, and cyclically transmits radar signals in a known manner.

A protected area is present in the environment, i.e. the area in which the radar is configured to signal the access and presence of particular targets. The protected area is preferably an area in which there is a cause of danger, such as machinery in or adjacent to the protected area, for example in an industrial environment.

The protected area can coincide with the field of view of the radar or be a subset thereof. Therefore, the detection modes that are described below may not be applied to the entire field of view of the radar, if targets are to be ignored at some locations or if conventional processing is satisfactory for at least certain areas of the field of view.

Still in a known manner, the radar cyclically receives radar signals from the protected area, mainly originating from reflections of the signals that are transmitted and impinge on targets in the environment. Therefore, the radar signals are processed in a known manner to cyclically obtain a detection profile. In each detection cycle, the detection profile associates with each position in the protected area an amount of radar signal that has been reflected in that position.

In known techniques for obtaining a detection profile, the radar signals are transmitted with Frequency Modulated Continuous Waves (known as FMCW). The received signals are then mixed with the transmitted signals, and the mixed signals are converted into the frequency domain. Each frequency thus corresponds to a distance from the radar. Further known processing operations may also lead to the discrimination of azimuth and/or elevation angles, in addition to the distance, and to the correction of Doppler-based frequency variations.

Once the detection profile has been obtained, this constitutes a basis for analysis of at least two, preferably at least three distinct detection modes, which according to the invention are activated at distinct times and/or in distinct areas, as detailed below.

One of the detection modes is named as first movement detection mode, or base detection mode (or for brevity first movement mode or base mode). The base mode is started and executed for a first series of detection cycles. The first series of detection cycles ends when a moving target is detected within the protected area, using the base detection mode.

When a target is detected with the base detection mode, measures may be taken for target signaling and/or alarming and/or securing of the protected area, for example by slowing down or shutting down the machine that is the cause of danger.

During the first series of cycles, targets are not expected to be detected with the other two main detection modes of the method: the fine movement detection mode and the presence detection mode as detailed below. Alternatively, one or both of these modes may be carried out in background but target detections based on these modes will not lead to actuation of the aforementioned measures.

The base detection mode is configured to detect targets in the protected area after elimination of a part of the detection profile, to be insensitive to motionless targets and sensitive to dynamic targets that move between different locations in the protected area.

Preferably, the base detection mode comprises removing a base static contribution from the detection profile, to isolate a base dynamic contribution from the detection profile. Both of these contributions are intended as signal distributions as a function of the position in the protected area, in the same manner as the detection profile. Therefore targets are detected in the protected area based on the dynamic base contribution only, without considering the static base contribution, by identifying signal peaks of the dynamic base contribution among the positions.

The static base contribution may be calculated according to the known techniques of generating a background profile. For this purpose, the basic detection mode comprises generating and cyclically updating the static base contribution by combining detection profiles for a first predetermined number of the last detection cycles. The combination may be, for example, a moving average, or other types of combinations obtained by Finite Impulse Response (FIR) or infinite Impulse Response (IIR) digital filters. In each of these cases the combination combines signal values referred to corresponding positions for different cycles.

It should be noted that updating the static base contribution accounts for a fixed number of the latest detection cycles, so that, at each subsequent cycle, the detection profile of a specific cycle is excluded from the set of profiles previously encompassed by the update, and a detection profile of a more recent cycle is added to this set.

This update mode causes the static base contribution to be only representative of the signal reflected by static targets that remain in place. Conversely, the remaining component given by the dynamic base contribution is only representative of the signal reflected by dynamic targets that move between various locations in the protected area.

Dynamic targets only have a minor influence on the calculation of the static base contribution. They reflect the signal from locations that change between different cycles, so that the average or another combination of successive detection profiles will give for each position a contribution that comes from the dynamic target for a single cycle, combined with the contribution of only static targets for all the other cycles of the combination. Therefore, the final result of the combination only has small variations from the contribution of the static targets alone.

It should also be noted that static targets may include motionless targets, which remain in place without making movements, and moving static targets, which make movements while remaining in place. Motionless targets may consist of fixed objects, generally inanimate objects or plants, or rarely, in circumstances to be prevented, by human, or animal targets that are completely motionless. Even relatively limited vital signs may in fact be sufficient to cause an essentially stationary human to fall into the class of moving static targets.

The method of updating the static base contribution as described above considers both types of static targets in substantially the same manner. The movements that can be made by a target that remains in place generally lead to reduced signal changes, in positions of the protected area in which most of the signal reflected by the target is present for the whole first number of the latest detection cycles, which are combined to calculate the static base contribution. Therefore, the moving static targets are generally included in the static base contribution and are not detected and signaled by the base mode, in the same manner as motionless targets.

As mentioned above, the other two main modes are not active to signal targets during the first series of cycles, but during a second series of cycles following the first. Thus, they are launched once the base mode has detected a target, thereby ending the first series of cycles.

These two modes are a second movement detection mode, or fine movement detection mode (or for brevity second movement mode or fine movement mode) and the presence detection mode (or presence mode). It shall be noted that some of the characteristics of the second movement mode are the same as those of the first movement mode. For this reason, the two modes can be selected to be identical in some embodiments. Nevertheless, greater emphasis will be given to the preferred embodiments in which the two modes are different, with the main purpose of making the second movement mode more sensitive than the first.

The fine movement mode and the presence mode are simultaneously active in different subsets of the protected area. This is because the protected area is split into one or more first areas and one or more second areas. The fine movement mode is activated to detect targets in each first area, and the presence mode is activated to detect targets in each second area. When a target is detected in these areas according to these modes, measures are taken for target signaling and/or alarming and/or securing of the protected area, which are similar to those as already mentioned for the base mode in the first series of cycles.

It will be apparent from the following that the presence mode is more sensitive than the fine movement mode, which is in turn more sensitive than the base mode. In each area in which at least one mode is described as active, also one or more of the less sensitive modes may be optionally active in parallel. On the other hand, more sensitive modes (among those described herein) than the one envisaged for a specific cycle or a specific area are not provided or can at most be run without considering the targets detected by them.

The method then comprises returning to the base mode, ending the second series of cycles and restarting a new first series of cycles, when the fine movement detection mode and the presence detection mode do not detect targets in the respective areas for a predetermined number of consecutive second cycles. This ensures that all targets that entered the protected area and were detected by the base mode have exited before starting again with the base mode.

The presence detection mode comprises detecting both dynamic and static targets (regardless of whether they are motionless targets or moving static targets) in each second area based on the entire detection profile, i.e. identifying peaks of the detection profile over the various positions. It is therefore the most sensitive and the safest, but also the most prone to false alarms. For this reason, the appropriate selection of the first and second areas can bring significant advantages to the method of the invention, combining where possible maximum safety with a reduced occurrence of false alarms, as described below.

Like the base mode, the fine movement mode is configured to detect targets in each first area after the elimination of a part of the detection profile, to be insensitive to motionless targets and sensitive to dynamic targets, and is preferably different from the first movement detection mode.

According to the preferred embodiments, the fine movement mode comprises obtaining from the detection profile a fine dynamic contribution, generally different from the basic dynamic contribution. The dynamic fine contribution represents the signal reflected by dynamic targets by the moving static targets, while motionless static targets remain excluded.

Therefore, the fine movement mode includes detecting targets in each first area based on the fine dynamic contribution. Therefore it is safer than base mode, but less sensitive and less prone to false alarms than presence mode.

More in detail, the fine movement mode comprises cyclically generating and updating a static fine contribution, generally other from the static base contribution, but also representative of signal amounts as a function of the positions in the protected area. In the preferred embodiment this is given by a combination of detection profiles of the latest detection cycles, starting from a fixed cycle. Unlike the combination that leads to the static base contribution, this combination does not always involve a fixed number of profiles, but a number of profiles that increases with each new cycle, until a second predetermined number of detection cycles is reached.

The fixed cycle is initially selected with the start of the second series of detection cycles. Once the second predetermined number of cycles has been exceeded, a new fixed cycle that follows immediately is established, and the accumulation of cycles to be considered in the combination is resumed from zero.

The second predetermined number is greater than the first predetermined number, and therefore acquires the contribution of static targets more slowly therein.

Furthermore, in the preferred embodiment the dynamic fine contribution is not set at each cycle as the mere difference between the current detection profile and the dynamic contribution, but is given by the maximum deviations recorded for each position of the protected area, starting from the fixed cycle, between the detection profile of the current cycle from time to time and the fine static contribution.

In particular, the preferred deviations are a deviation in modulus and a deviation range in phase (these are profiles and contributions in the domain of complex numbers). The deviation in modulus represents the maximum modulus assumed, for the position under consideration, by the difference between the current profile and the static fine contribution. The range of deviations in phase represents the difference between the maximum and the minimum phases assumed, for the position under examination, by the difference between the current profile and the static fine contribution, by only accounting for the differences for which there is a significant modulus, above a threshold of consideration.

A target is signaled if the deviation in modulus or the deviation range in phase exceed respective sensitivity thresholds.

It should be noted that the moving static targets, although their signal contributions help to create the static base or static fine contributions, easily generate signal changes that especially widen the phase range of deviations, and therefore can be detected by the fine movement detection mode.

Some possible advantageous ways of splitting the protected area into first areas and second areas are now described. Each area is preferably identified by a sector with a certain range of distances from the radar and a certain range of angles, for example azimuthal angles, with respect to a reference direction.

The area may be manually split by an operator, who stores the first areas and the second areas in the system, ether in an automated manner by the system, or in only partially automated manners, for example with constraints imposed by the operator. The storing takes place before the first and second series of cycles, as detailed below. Thus, beyond occasional splitting updates, the first and second areas remain the same for the whole duration of the first and second series of cycles.

In all these cases, splitting the protected area preferably comprises selecting at least a portion of the protected area in which fixed objects are present, generally identified as motionless targets, as first area, and selecting at least a portion of the protected area in which fixed objects are not present as second area.

Although all the areas with fixed objects are preferably selected as first areas, it is possible that not all the areas without fixed objects are selected as second areas, but only some of them.

For example, an operator lock a predetermined portion of the protected area as a first area, knowing that, although there are no fixed objects therein at the time of splitting, they may be placed therein in the future. For example, this portion can be a loading and unloading area.

Locking this portion as a first area means that the area is not selected as a second area, neither initially nor in case of subsequent automated splitting updates, unless the imposed lock is removed.

In an at least partially automated mode, splitting the protected area comprises carrying out a splitting cycle in which the presence detection mode is used to detect targets in the whole the protected area. This allows identifying the portions of the protected area in which fixed objects are present and are not present. The splitting cycle is preferably selected so that no dynamic targets are present in the protected area. This check may be made, for example, by an operator, or based on other modes such as the base detection mode.

Optionally, not a single splitting cycle is run, but a first splitting cycle, before the first series of cycles, leading to a first split into first and second areas, followed by at least one updating splitting cycle, valid for the following first and second series of cycles, leading to a redefinition of the first and second areas. The redefinition procedures may be similar to those of the first splitting.

In certain embodiments, the updating splitting cycles are performed according to a predetermined regular timing. Alternatively, the method comprises periodically checking whether splitting is adequate or whether an update is required, either manually or by means of a checking mode operating in parallel with the other described modes.

In both cases, from the time the system determines that an update must be made, the update may not be immediate, but only occur after an enable period in which no target is detected. The updating splitting cycle is then postponed if at least one target is detected in the enable period. The definition of the first and second areas is thus prevented from being affected by the presence of undesired targets.

During the enable period, for the whole duration thereof or for a given interval of time, the base mode and/or the fine movement mode may be used for enabling purposes, while target signaling or securing measures are still based on the above described modes. Preferably, the enable period comprises at least one final interval in which the fine movement mode is used to detect targets in the whole the protected area.

A similar enabling arrangement may be provided not only for updating splitting cycles, but also for the first splitting cycle.

It should be noted that in case of denied consent, current splitting has been found inappropriate by the checking mode. Therefore, if an update is determined to be needed, the entire protected area will be preferably made as a first area until an updating splitting cycle is executed. This avoids continuous alarms due to the presence of a fixed object that has been placed in one of the second areas and makes splitting inappropriate.

The preferred checking mode includes identifying the portions of the protected area in which fixed objects are present and are absent, then comparing the portions in which fixed objects are present with the one or more first areas and comparing the portions in which fixed objects are absent with the one or more second areas. The checking mode may use the presence mode, again preferably enabled by another mode, such as the base mode, which checks the absence of mobile targets.

Despite these checks, there is the inevitable possibility that, during the second series of cycles, a fixed object is placed in one of the second areas. In such case, the presence mode never stops seeing targets, and the second series of cycles potentially continues to infinity, so that the protected area would never be declared again as safe.

Therefore, the method may comprise the possibility of a forced restart whereby the second series of cycles ends and returns to the basic detection mode even if the presence detection mode detects a target in said second area. Forced restart is to be actuated by a user if only fixed objects are present in the protected area.

Actuation of the forced restart may be alternative or complementary to the checking mode for the system to determine that current splitting is no longer deemed to be adequate, and an update is required. This obviously can make the whole protected area a first area, if an updating splitting cycle is not enabled to be immediately carried out.

A skilled person may obviously envisage a number of equivalent changes to the above discussed variants, without departure from the scope defined by the appended claims.

The invention claimed is:

1. A method of radar detection of targets in an environment, comprising:
   cyclically transmitting and receiving radar signals in a protected area,
   processing the radar signals to cyclically obtain a detection profile that associates with each position in the protected area an amount of radar signal that has been reflected,
   splitting the protected area into one or more first areas and one or more second areas, by selecting as first area at least a portion of the protected area in which motionless targets are present, and selecting as second area at least a portion of the protected area in which motionless targets are not present,
   after splitting the protected area, running a first series of cycles and a second series of cycles following the first series of cycles,
   running a first movement detection mode during the first series of detection cycles and not during the second series of cycles, the first movement detection mode being configured to trigger a target alarm upon detecting targets in the one or more first areas and the one or more second areas of the protected area, after eliminating a part of the detection profile, the first movement detection mode being insensitive to motionless targets and sensitive to dynamic targets that move between different locations in the protected area,
   as a moving target is detected within the protected area, ending the first series of detection cycles and starting the second series of cycles,
   running a second movement detection mode during the second series of detection cycles and not during the first series of cycles, the second movement detection mode being configured to trigger a target alarm upon detecting targets in the one or more first areas and not in the one or more second areas,
   a presence detection mode during the second series of detection cycles and not during the first series of cycles, the second movement detection mode being configured to trigger a target alarm upon detecting targets in the one or more second areas and not in the one or more first areas,
   wherein the second movement detection mode is configured to detect targets in the one or more first areas after eliminating a part of the detection profile, to be insensitive to motionless targets and sensitive to dynamic targets,
   wherein the presence detection mode comprises
   detecting motionless and dynamic targets in each second area based on entire detection profile,
   ending the second series of detection cycles and restarting the first series of detection cycles when the second movement detection mode and the presence detection mode do not detect targets for a predetermined number of successive second cycles.

2. The method according to claim 1, wherein:
   the first movement detection mode is a base detection mode, which comprises removing from the detection profile a base static contribution, representing the signal reflected from static targets that stay in place, either motionless or performing movements, to thereby isolate from the detection profile a base dynamic contribution, representing the signal reflected from the dynamic targets, to detect targets in the protected area based on the dynamic contribution, the second movement detection mode is a fine movement detection mode, which comprises obtaining from the detection profile a fine dynamic contribution, representing the signal reflected from the dynamic targets and from moving static targets which perform movements while staying in place, with the exclusion of motionless targets that stay in place without performing movements, to detect targets in each first area based on the fine dynamic contribution.

3. The method according to claim 2, wherein:

the base detection mode comprises generating and cyclically updating the base static contribution by combining detection profiles for a first predetermined number of the last detection cycles, and the fine movement detection mode comprises generating and cyclically updating a static fine contribution, by combining detection profiles of the last detection cycles from a fixed cycle until a second predetermined number of detection cycles is reached, greater than the first predetermined number, and setting as the fine dynamic contribution the maximum deviations from the static fine contribution recorded for each position in the protected area from the fixed cycle.

4. A method as claimed in claim 1, wherein splitting the protected area comprises identifying the portions of the protected area in which motionless targets are present and in which motionless targets are not present, by running a splitting cycle in which the presence detection mode is used to detect targets in the whole protected area, the splitting cycle being selected such that no dynamic targets are present in the protected area.

5. A method as claimed in claim 4, comprising performing a first splitting cycle and then at least one updated splitting cycle in which the one or more first areas and the one or more second areas are redefined.

6. A method as claimed in claim 5, comprising locking a predetermined portion of the protected area as first area and preventing the predetermined portion from being redefined as second area during the first splitting cycle and during the at least one updated splitting cycle.

7. A method as claimed in claim 5, wherein each updated splitting cycle is run only after an enable period in which no target is detected, the updated splitting cycle being postponed if at least one target is detected during the enable period.

8. A method as claimed in claim 7, wherein:

the first movement detection mode is a base detection mode and the second movement detection mode is a fine movement detection mode, more sensitive than the base detection mode, the enable period comprises at least one final interval in which the fine movement detection mode is used to detect targets in the whole protected area.

9. A method as claimed in claim 5, comprising periodically checking whether splitting is adequate or needs to be updated and, if it needs to be updated, setting the entire protected area as first area until an updated splitting cycle is run.

10. A method as claimed in claim 9, wherein periodically checking whether splitting is adequate or needs to be updated comprises starting a checking mode parallel to the first movement detection mode or the second movement detection mode or the presence detection mode, the checking mode comprising:

identifying the portions of the protected area in which motionless targets are present and are not present, comparing the portions in which motionless targets are present with the one or more first areas and comparing the portions in which motionless targets are not present with the one or more second areas.

11. A method as claimed in claim 1, comprising, if an inanimate object is placed in at least one second area during the second series of cycles, and only motionless targets are present in the protected area, forcing a restart by an operator so that the second series of cycles ends and the first movement detection mode is restored even if the presence detection mode detects a target in said second area, preferably wherein forcing the restart determines that the current splitting is deemed to be no longer adequate, and needs to be updated.

* * * * *